United States Patent
Chu et al.

(10) Patent No.: US 12,096,224 B2
(45) Date of Patent: *Sep. 17, 2024

(54) SECURE PAIRING OF WIRELESS DEVICES

(71) Applicant: DISH Network L.L.C., Englewood, CO (US)

(72) Inventors: Shiqiang Chu, Highlands Ranch, CO (US); Alan Terry Pattison, Castle Rock, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,396

(22) Filed: Jun. 13, 2023

(65) Prior Publication Data

US 2023/0328531 A1 Oct. 12, 2023

Related U.S. Application Data

(63) Continuation of application No. 16/742,704, filed on Jan. 14, 2020, now Pat. No. 11,696,139.

(51) Int. Cl.
*H04W 12/50* (2021.01)
*H04M 1/72412* (2021.01)
*H04W 4/80* (2018.01)
*H04W 8/00* (2009.01)
*H04W 76/14* (2018.01)
*H04W 84/12* (2009.01)

(52) U.S. Cl.
CPC ....... *H04W 12/50* (2021.01); *H04M 1/72412* (2021.01); *H04W 4/80* (2018.02); *H04W 8/005* (2013.01); *H04W 76/14* (2018.02); *H04W 84/12* (2013.01)

(58) Field of Classification Search
CPC ....... H04W 12/50; H04W 4/80; H04W 8/005; H04W 76/14; H04W 84/12; H04W 4/50; H04W 12/069; H04M 1/72412; H04M 1/72442; H04L 63/0838
USPC ........................................................ 455/41.2
See application file for complete search history.

(56) References Cited

U.S. PATENT DOCUMENTS

| | | |
|---|---|---|
| 11,696,139 B2 * | 7/2023 | Chu .................. H04M 1/72412 455/41.2 |
| 2017/0272819 A1 | 9/2017 | Zerr et al. |
| 2019/0004940 A1 | 1/2019 | Boyd et al. |
| 2019/0361694 A1 | 11/2019 | Gordon et al. |
| 2020/0126354 A1 | 4/2020 | Froy |
| 2020/0174753 A1 | 6/2020 | Binal et al. |
| 2020/0193752 A1 | 6/2020 | Burris et al. |
| 2021/0272687 A1 | 9/2021 | Klopfenstein et al. |

* cited by examiner

*Primary Examiner* — Eugene Yun
(74) *Attorney, Agent, or Firm* — Kipman Tyler Werking; Frontier IP Law PLLC

(57) ABSTRACT

A facility for establishing a wireless connection between first and second devices is described. On the first device, the facility causes a one-time pairing code to be displayed, then wirelessly receives from the second device a wireless connection solicitation having contents. On the first device, in response to the receiving, the facility determines whether the contents reflect the one-time pairing code. In response to determining that the contents reflect the one-time pairing code, on the first device, the facility establishes the wireless connection between the first and second devices.

17 Claims, 7 Drawing Sheets

SECURE PAIRING OF WIRELESS DEVICES

BACKGROUND

A main television receiver (such as a set-top box provided by a cable or satellite television service provider) is connected to a cable or satellite television service provider and serves as the interface between the backend cable or satellite television service provider system and the home entertainment system on the customer premises. One or more other receiving devices ("player devices" or "presentation devices"), connected to this television receiver, can each be connected to respective TVs throughout the customer premises. For example, the player devices may be connected to the television receiving device via a home local area network (LAN) that is wired, wireless, or hybrid, and communicate over the LAN with the television receiving device using the transmission control protocol/Internet protocol (TCP/IP) suite of networking communication protocols. These player devices are able to play on their respective TV the live broadcast, recorded, streaming and on-demand programming initially received by the television receiving device from the cable or satellite television service provider or other content provider.

It is common for a technician to install the television receiver and player devices at the premises of a customer, such as in response to the customer signing up for a cable or satellite television service. For example, the technician performing such an installation may pick up the needed television receiver and player devices from a warehouse where they are stocked, and carry them to the customer's home or other premises. In some cases, the technician further installs—and sometimes also delivers—other related equipment, such as coaxial cables or splitters, satellite dishes and controllers, antennas of other types, etc.

In some cases, it is common for the player devices to communicate with the television receiver using a wireless connection, such as a Wi-Fi connection. Each of these devices can use either an integrated wireless module—including such components as a wireless chip set, radio, and antenna—to participate in such wireless connections, or an add-on wireless module, such as one that connects to the device via a connector such as a USB connector or an Ethernet connector, either directly or via a cable.

When one or more of these media devices are being installed in customer premises, such as by an installation technician, affirmative actions typically must be performed in order to establish communication between the devices. In some cases, the devices support a Wi-Fi Protected Setup ("WPS") process for establishing communications among them. As part of this process, the technician presses a button on the first one of a pair of devices; within a short time, press a button on the second one of the pair of devices; and, within another short time, again press the button on the first one of the pair.

DETAILED DESCRIPTION

Figure 1:
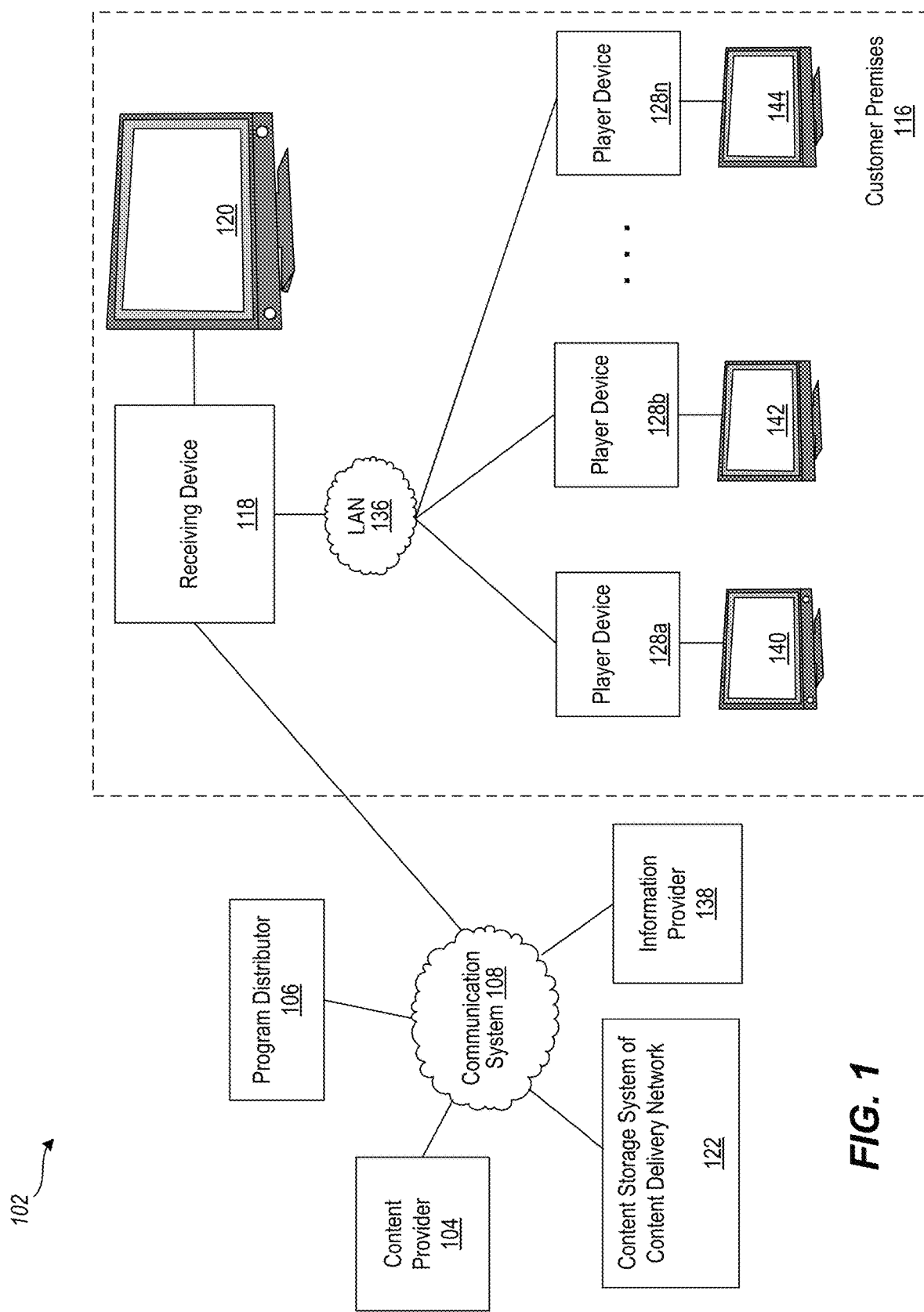
FIG. 1 is a block diagram showing some of the components typically incorporated in at least some of the computer systems and other devices on which the facility operates.

The inventors have identified disadvantages with conventional approaches to establishing wireless communication between media devices. In particular, the inventors have recognized that conventional approaches create a need for installation technicians or others to move rapidly through the customer's home, raising the likelihood of injury to the technician or a bystander, and the likelihood of property damage. Also, in cases where the technician does not arrive quickly enough, s/he must repeat the process, causing the installation process to occupy more time.

The inventors have also recognized the disadvantage that the conventional approach has a security vulnerability: during the time after the button on the first device is pressed, a neighbor or passerby can press the corresponding button on their device, and become illicitly connected or enrolled without providing any affirmative credentials. This can result at least in theft of services in the unauthorized use of Internet access. A sophisticated user could use this enrollment to compromise connected devices, accessing, changing, or deleting sensitive information stored on them; or installing a Trojan horse, virus, or other exploit.

In response to the inventors' recognition of these disadvantages, they have conceived and reduced to practice a software and/or hardware facility for securely and conveniently pairing wireless devices such as media devices ("the facility").

In some embodiments, the facility establishes wireless communication between a pair of devices using a pairing code. A user such as an installer technician for a satellite or cable television service activates a pairing mode of a first device of the pair. In response, the first device generates and displays a one-time pairing code, or causes an associated device to do so, such as on a smartphone, tablet device, media remote control, or other mobile device. The user then activates a pairing mode of the second device of the pair, which prompts the user to enter the pairing code generated by the first device. In some embodiments, the facility provides a significant period of time to enter the pairing code on the second device, such as 10 minutes. Upon entry of the pairing code, the second device contacts the first device, and the two devices negotiate a secure connection. The first device then enrolls a pairing with the second device, such as by storing a network address of the second device in an enrollment whitelist, providing credentials to the second device to offer in connection with future contacts of the second device, etc.

A third device without access to the pairing code cannot establish a connection with the first device (or the second device), even while both of these devices are in pairing mode. Also, after the pairing with the second device is completed, or the pairing mode of the first device times out or is affirmatively canceled, the pairing code can no longer be used to pair any device with the first device (or the second device), even at times when either device is again in pairing mode.

After the facility establishes wireless communication between the two devices, they can exchange data securely. For example, where the first device is a media receiver and the second device is a media player, the first device may download device software to the second device to install, and/or the first device may forward media content to the second device to present.

By performing in some or all of the ways discussed above, the facility enables a user to securely and conveniently establish wireless communications between two devices.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task. As one example, by establishing wireless communication between two devices as described, the facility avoids malicious exploitation of either of the two devices, which can result in one or both of the two devices operating in an unintended and potentially dangerous way, or becoming completely disabled, creating service downtime requiring service or replacement to resume normal functioning. The facility also prevents the expenditure of resources that would be used by the unauthorized user, thus maintaining full resources for use of authorized users.

FIG. 1 is an overview block diagram illustrating an example installed television service customer premises environment in which the facility installs software or media devices in some embodiments. In the customer premises environment 102, audio, video, and/or data service providers, such as television service providers, provide their customers a multitude of video and/or data programming (herein, collectively "programming"). Such programming is often provided by use of a receiving device 118 communicatively coupled to a presentation device 120 configured to receive the programming. The programming may include any type of media content, including, but not limited to: television shows, news, movies, sporting events, advertisements, etc. In various embodiments, any of this programming may be provided as a type of programming referred to as streaming media content, which is generally digital multimedia data that is substantially constantly received by and presented to an end-user or presented on a device while being delivered by a provider from a stored file source. Its verb form, "to stream," refers to the process of delivering media in this manner. The term refers to how the media is delivered rather than the media itself.

The receiving device 118 interconnects to one or more communications media or sources. For example, the various media content may be delivered as data using the IP suite over a packet-switched network such as the Internet or other packet-switched network. The underlying connection carrying such data may be via a cable head-end, satellite antenna, telephone company switch, cellular telephone system, Ethernet portal, off-air antenna, or the like. The receiving device 118 may receive a plurality of programming by way of the communications media or sources, or may only receive programming via a particular channel or source described in greater detail below. In some embodiments, based upon selection by a user, the receiving device 118 processes and communicates the selected programming to the presentation device 120. Also, in some embodiments, the presentation device 120 may also be a receiving device 118 or have a receiving device 118 integrated within it.

In various embodiments, examples of a receiving device 118 include, but are not limited to, one or a combination of the following: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," and/or "television tuner," etc. Accordingly, the receiving device 118 may be any suitable converter device or electronic equipment that is operable to receive programming via a connection to a satellite or cable television service provider outside the customer premises and communicate that programming to another device over a network. Further, the receiving device 118 may itself include user interface devices, such as buttons or switches. In some example embodiments, the receiving device 118 may be configured to receive and decrypt content according to various digital rights management (DRM) and other access control technologies and architectures as part of the process of secure communications between media devices, which will be described in further detail below.

In various embodiments, examples of a presentation device 120 include, but are not limited to, one or a combination of the following: a television ("TV"), a personal computer ("PC"), a sound system receiver, a digital video recorder ("DVR"), a compact disk ("CD") device, DVD Player, game system, tablet device, smart phone, mobile device or other computing device or media player, and the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

As shown in FIG. 1, a plurality of player devices 128a, 128b, 128n are communicatively connected to the television receiving device via a home LAN 136 that generally covers only part or all of the customer premises 116. There may be fewer or additional player devices in various embodiments. In some embodiments, each of the player devices 128a, 128b, 128n communicates over the LAN 136 with the television receiving device using the transmission control protocol/Internet protocol (TCP/IP) suite of networking communication protocols. In various embodiments, all or part of the LAN 136 may be wired or wireless. These player devices are able to receive from the receiving device 118, over LAN 136, and play on their respective connected presentation devices 140, 142, 144, the live broadcast, recorded, streaming and/or on-demand programming initially received by the receiving device 118 from the cable or satellite television service provider. In the present example, the cable or satellite television service provider may encompass or be in communication with some or all of the content provider 104, program distributor 106, content storage system of content delivery network 122, and/or information provider 138.

In particular, a content provider 104 provides program content, such as television content, to a distributor, such as the program distributor 106. Example content providers include television stations which provide local or national television programming and special content providers which provide premium based programming, pay-per-view programming, and on-demand programming.

Program content (i.e., a program including or not including advertisements), is communicated to the program distributor 106 from the content provider 104 through suitable communication media, generally illustrated as communication system 108 for convenience. Communication system 108 may include many different types of communication media including those utilized by various different physical and logical channels of communication, now known or later developed. Non-limiting media and communication channel examples include one or more, or any operable combination of, telephone systems, the Internet, cable systems, fiber optic systems, microwave systems, asynchronous transfer mode ("ATM") systems, frame relay systems, digital subscriber line ("DSL") systems, radio frequency ("RF") systems, cellular systems, and satellite systems.

In some embodiments, the received program content is converted by the program distributor 106 into a suitable signal (a "program signal") that is ultimately communicated to the receiving device 118. Various embodiments of the receiving device 118 may instead receive programming from program distributors 106 and/or directly from content providers 104 via locally broadcast RF signals, cable, fiber optic, Internet media, or the like via the communication system 108, such as from the content storage system of a content delivery network 122.

For example, Video on Demand (VOD) systems may allow a user of the receiving device 118 to select, watch and/or listen to video and audio content on demand. For example "Internet Television" and "Internet Protocol Television" (IPTV) are systems through which various media content is delivered using the Internet IP suite over a packet-switched network such as the Internet represented by communication system 108 to the receiving device 118, instead of being delivered through traditional channels using terrestrial, satellite signal, and cable television formats of the communication system 108. In various example embodiments, such technologies are deployed within the content distribution environment 102 such as in subscriber-based telecommunications networks of the communication system 108 with high-speed access channels into the customer premises 116 via the receiving device 118 (e.g., a set-top box or other customer-premises equipment) to bring VOD services to the customer premises 116.

In various example embodiments, television VOD systems stream media content via the communications system 108 from files stored at the content storage system of the content delivery network 122, under direct or indirect control of the program distributor 106, to the receiving device 118. The content storage system of the content delivery network 122 may also comprise multiple separate storage facilities and streaming media content servers geographically separated from each other (also referred to as an "edge cache"), each of which streams stored media content to particular customer locations based on a number of factors such as proximity of the customer premises 116 to the individual content storage system of the content delivery network 122 location or edge cache, load balancing parameters, current demand on the individual content storage system of the content delivery network 122, capacity of the individual content storage system of the content delivery network 122, etc.

Television VOD systems may stream content to a receiving device 118 such as a set-top box, DVD player, game system, smart phone, television (including a smart TV), PC, a sound system receiver, a digital video recorder ("DVR"), a compact disk ("CD") device, tablet device, mobile device, or other computing device or media player, and the like, allowing viewing in real time at the customer premises 116, or download it to a receiving device 118 such as a computer, DVR (also called a personal video recorder) or portable media player for viewing at any time. The receiving device 118 may in turn provide each of the player devices 128a, 128b, 128n access to such content from the receiving device 118 over the home LAN 136, such that each player device 128a, 128b, 128n may play the content on their respective connected presentation devices 140, 142, 144, at various locations throughout the customer premises 116. In some embodiments, the presentation device may be integrated as part of the player device. Also, in some embodiments, a player device may communicate with the receiving device 118 to receive such content remotely via the Internet or otherwise via communication system 108. The program distributor 106 may offer VOD streaming, including pay-per-view and free content, whereby a user buys or selects a movie or television program and it begins to play on the presentation device 120 or on other presentation devices 140, 142, 144 via their respective player devices 128a, 128b, 128n almost instantaneously; downloading of the media content to a DVR rented from the program distributor; and/or downloading the content onto a computer or mobile device, for viewing in the future.

In some embodiments, the receiving device 118 may be a set-top box provided by the cable provider, satellite provider, or other program distributor 106 to which the customer may subscribe to receive such on-demand services and that also receives programming through traditional channels using a terrestrial, satellite signal, and/or cable television format. The various player devices 128a, 128b, 128n on the customer premises in communication with the receiving device 118 may also be devices provided by the cable provider or satellite provider. However, in some instances, such player devices may be devices other than those provided by the cable provider or satellite provider. For example, these may include various user devices such as a television, a digital video recorder (DVR), digital versatile disc (DVD) player, personal computer (PC), tablet device, game machine, smart phone, mobile device, or other computing device or media player not provided by or controlled by the cable provider, satellite provider, or other program distributor to which the customer subscribes for the on-demand services.

In some embodiments, each player device 128a, 128b, 128n establishes an Internet Layer end-to-end security connection between the receiving device 118 and each player device 128a, 128b, 128n as part of the initial pairing process between each player device 128a, 128b, 128n and the receiving device 118 to generate a VPN over LAN 136 between each player device 128a, 128b, 128n and the receiving device 118 results in increased security by having all IP traffic between the receiving device 118 and each player device 128a, 128b, 128n be encrypted.

In addition, information provider 138 may provide various forms of content and/or services to various devices residing in the customer premises 116. For example, Information provider 138 may also provide information to the receiving device 118 regarding insertion of advertisements or other additional content or metadata into a media content segment provided to the receiving device 118. In some embodiments, such advertisements or other additional content or metadata may be provided by an advertisement server to the content provider 104, directly to the receiving device 118, or be inserted into the streaming media stored on the content storage system of the content delivery network 122 or inserted as it is being streamed to the receiving device 118. The information provider 138 may also, or instead, be another third party entity providing security data and/or services related to authentication, encryption, digital media rights, etc., on behalf of the program distributor 106 or other authorized entity.

Encryption and decryption described herein may be performed as applicable according to one or more of any number of currently available or subsequently developed encryption methods, processes, standards and/or algorithms including, but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the environment 102, the customer premises 116, and the various devices therein, is intended as a broad, non-limiting overview of an example environment in which various embodiments of secure communications between media devices may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Figure 2:
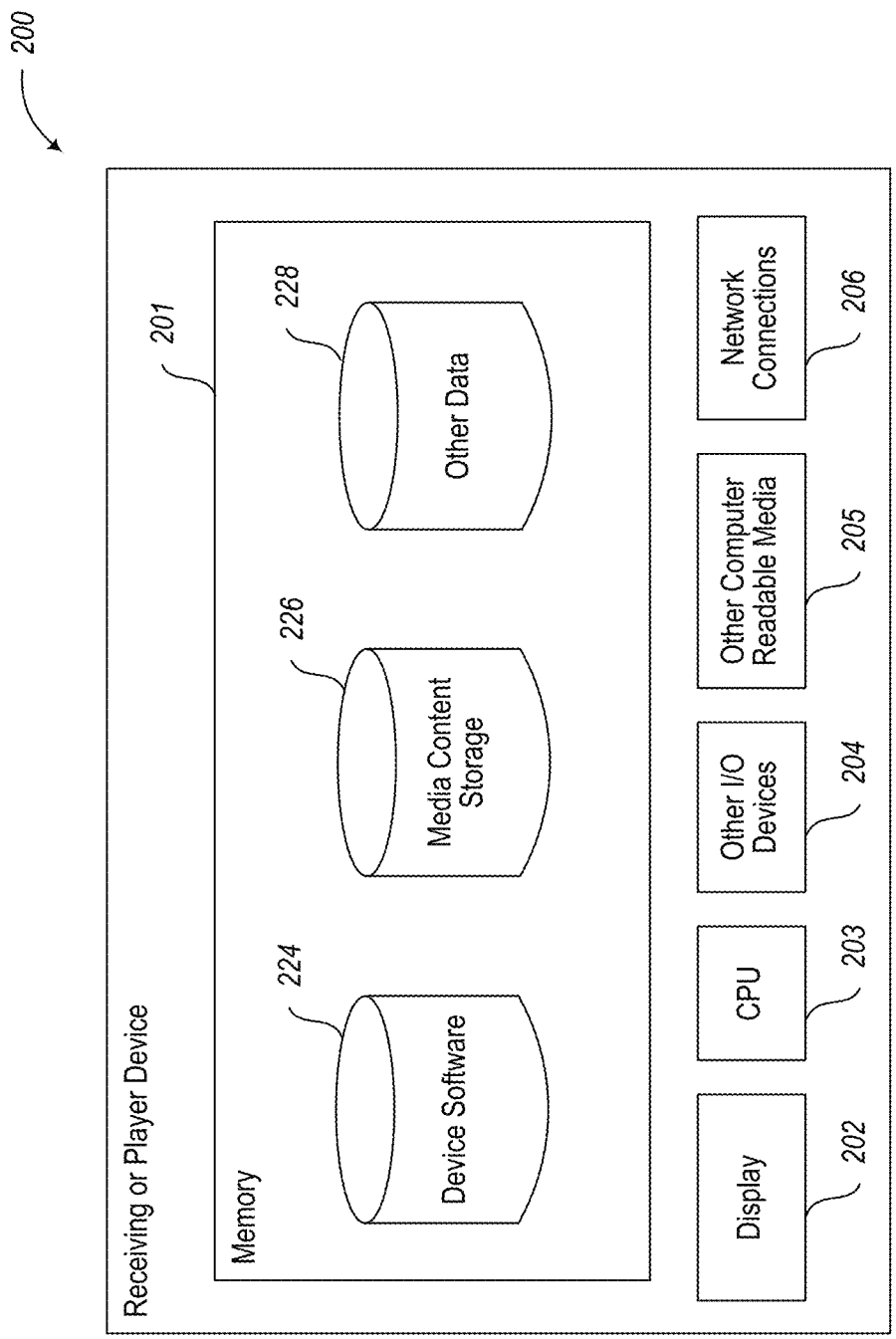
FIG. 2 is a block diagram illustrating elements of an example receiving or player device used in the environment in some embodiments.

FIG. 2 is a block diagram illustrating elements of an example receiving or player device used in the environment in some embodiments. In some embodiments, the receiving or player device 200 is a device such as a set-top box, television, DVR, DVD player, PC, tablet device, game machine, smart phone, mobile device, or other computing device or media player configured to receive programming via a connection to a satellite or cable television service provider outside the customer premises and to display such programming on a presentation device. For example, receiving or player device 200 may be configured to receive, process and display on a presentation device streaming media content received directly from the satellite or cable television service provider and/or other programming received directly from the satellite or cable television service provider such as cable or satellite television broadcasts via various other physical and logical channels of communication.

Note that one or more general purpose or special purpose computing systems/devices may be used to operate the receiving or player device 200; store information regarding the receiving or player device 200, store metadata, perform DRM and key management operations, decrypt and encrypt received content; pair with various player devices on a home LAN and/or over the Internet; establish an Internet Layer end-to-end security connection, such as a secure IP tunnel, over the home LAN and/or Internet between the receiving or player device 200 and various player devices; communicate data, including programming, between the receiving or player device 200 and various player devices via the Internet Layer end-to-end security connection over the home LAN and/or Internet; and communicate with the content provider 104, program distributor 106, information provider 138 and/or content storage system of the content delivery network 122. In addition, in some embodiments, the receiving or player device 200 may comprise one or more distinct computing systems/devices and may span distributed locations. Furthermore, each block shown may represent one or more such blocks as appropriate to a specific embodiment or may be combined with other blocks.

In some embodiments, receiving or player device 200 comprises a computer memory ("memory") 201, a display 202 (including, but not limited to a light emitting diode (LED) panel, cathode ray tube (CRT) display, liquid crystal display (LCD), touch screen display, etc.), one or more Central Processing Units ("CPU") 203, Input/Output ("I/O") devices 204 (e.g., keyboard, mouse, RF or infrared receiver, universal serial bus (USB) ports, other communication ports, and the like), other computer-readable media 205 contains device software 224, media content storage 226, and other data 228, and network connections 206. In some embodiments, the network connections 206 include a wireless connection, such as a Wi-Fi or other wireless connection. In some embodiments, the other I/O devices 204 include a connector for connecting a separate wireless communication module to the device, such as a USB connector or an Ethernet connector. In some embodiments, the other I/O devices 204 include an input device that can be used to input a pairing code, including, for example, a media remote control, a keyboard of another type, a microphone or other sound input device for speaking the pairing code, a mouse or other pointing device for picking out the characters of the pairing code on a displayed keyboard, etc. Of note, one or more of the components in FIG. 2 may or may not be present in any specific implementation. For example, some embodiments may not provide other computer readable media 205 or a display 202.

Device software 224 executes on one or more CPUs 203 or processors of other types, and facilitates the receiving, decrypting, decoding, processing, selecting, recording, playback and displaying of programming, as well as the establishing of an Internet Layer end-to-end security connection, such as a secure IP tunnel, over the home LAN and/or Internet between the receiving or player device 200 and various player devices and communication of data, including programming, between the receiving or player device 200 and various player devices via the Internet Layer end-to-end security connection over the home LAN and/or Internet, as described herein. The device software 224 may also facilitate on-demand media services (e.g., VOD services), on-demand program ordering, processing and DRM and key management and storage corresponding to processing received streaming media content and other programming. The device software 224 may operate as, be part of, or work in conjunction and/or cooperation with various on-demand service software applications stored in memory 201 and on various player devices. The device software 224 also facilitates communication with peripheral devices such as a remote control, via the I/O devices 204, and with the player devices 128a, 128b, 128n and remote systems (e.g., the content provider 104, the content storage system of the content delivery network 122, the program distributor 106, and/or the information provider 138) via the network connections 206.

In some embodiments, the device software 224 includes, for example, audio/video processing modules, a program guide manager module, a Web server, and the like. Recorded or buffered programming received as streaming media content or other types of programming may reside on the media content storage 226, either in decrypted or encrypted form as applicable for securely storing, processing and displaying of the received media content according to the applicable DRM associated with the particular programming. The media content storage 226 may also store various program metadata associated with the recorded or buffered programming stored in the media content storage 226, such as that including, but not limited to, DRM data, tags, codes, identifiers, format indicators, timestamps, user identifications, authorization codes, digital signatures, etc. Other data 228 can include user profiles, preferences and configuration data, etc.

In some embodiments, the receiving device establishes an Internet Layer end-to-end security connection (an Internet protocol (IP) encrypted tunnel) between the receiving device 118 and each player device as part of the initial pairing process between each player device 128a, 128b, 128n (shown in FIG. 1) and the receiving device 118. The device software 224 is configured to manage and perform this process. Equivalent modules also exist, as applicable, in each player device 128a, 128b, 128n shown in FIG. 1. Since all traffic between the receiving device 118 and an individual player device is communicated via IP on the LAN 136 (and/or Internet in some embodiments), all traffic between the two devices would be securely encrypted at the Internet Layer, thus reducing potential security issues. This results in a secure virtual private network (VPN) between each player device and the receiving device 118.

In some embodiments, the device software 224 is configured to process the decrypted streaming media content and render the data for display on a particular presentation device and/or transmission to a player device according to specifications and requirements of the presentation device and/or player device. The device software 224, in some embodiments working in conjunction with a media content decryption and encryption engine and/or a device pairing and data transmission module may encode, decode, encrypt, decrypt, compress, decompress, format, translate, perform digital signal processing, adjust data rate and/or complexity or perform other processing on the data representing received programming and other media content as applicable for presenting the received content in real time on the presentation device as it is being received by the receiving or player device 200 and/or for transmission to a player device over the IP encrypted tunnel.

In some embodiments, the device software 224 includes an application program interface ("API") that provides programmatic access to one or more functions of the receiving device 118. For example, such an API may provide a programmatic interface to one or more functions that may be invoked by any other program, a remote control (not shown), the program distributor 106, the content provider 104, information provider 138, content storage system of the content delivery network 122 or some other module. In this manner, the API may facilitate the development of third-party software, such as various different on-demand service applications, user interfaces, plug-ins, adapters (e.g., for integrating functions of the device software 224 into desktop applications), and the like to facilitate secure communications between media devices.

In an example embodiment, components/modules of the device software 224 are implemented using standard programming techniques. For example, such components/modules may be implemented as a "native" executable running on the CPU 203, along with one or more static or dynamic libraries. In other embodiments, the device software 224 may be implemented as instructions processed by a virtual machine that executes as another program. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving or player device 200 to perform various functions. In some embodiments, instructions cause the CPU 203 or some other processor, such as an I/O controller/processor, to receive decryption keys, access codes, identifications codes, etc., from external devices, such as wirelessly from a player device, other external device, or other external secure system in order to pair with the player device and establish an Internet Layer end-to-end security connection between the receiving or player device 200 and the player device for securely transmitting data.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve desired functions.

In addition, programming interfaces to the data stored as part of the receiving device 118 can be available by standard mechanisms such as through C, C++, C #, and Java APIs; libraries for accessing files, databases, or other data repositories; scripting languages such as XML; or Web servers, FTP servers, NFS file servers, or other types of servers providing access to stored data. The media content storage 226 and other data 228 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve desired functions.

Furthermore, in some embodiments, some or all of the components of the receiving or player device 200 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3:
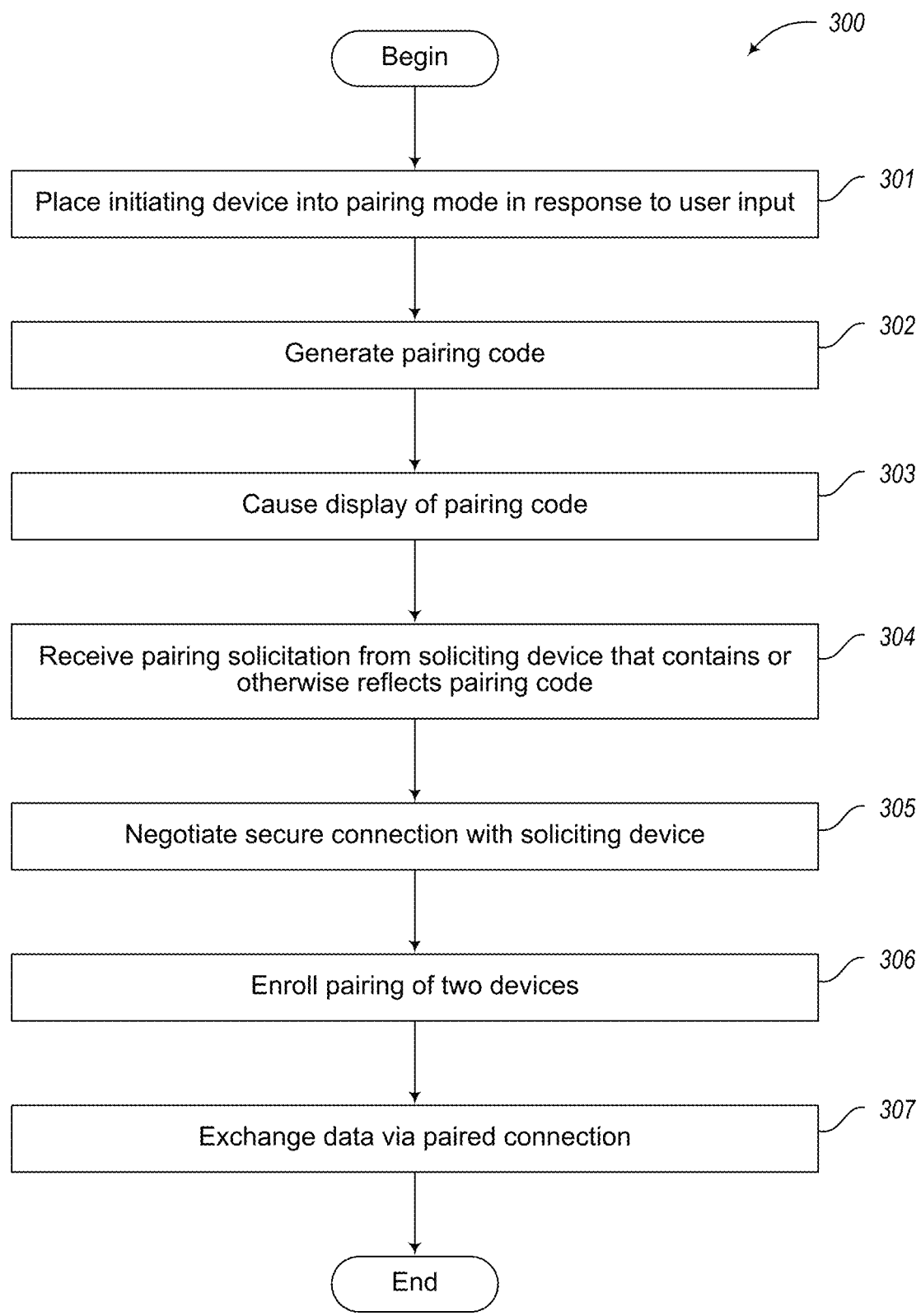
FIG. 3 is a flow diagram showing a process performed by the facility in some embodiments in an initiating device to pair the initiating device with a soliciting device.

FIG. 3 is a flow diagram showing a process performed by the facility in some embodiments in an initiating device to pair the initiating device with a soliciting device. In act 301, the facility places the initiating device into pairing mode in response to user input. In various embodiments, a user provides this user input by, for example, selecting an entry corresponding to pairing mode from a menu displayed by the initiating device; reaching a stage in an installation wizard that corresponds to wireless pairing with another device; speaking a voice command to perform a wireless pairing; etc.

In act 302, the facility generates a one-time pairing code to use for the present pairing operation. In some embodiments, the facility performs act 302 by generating a random number or random text string. In some embodiments, the facility retrieves the pairing code from a remote computer system. In some embodiments, the facility generates a pairing code by beginning with one or more fixed characters; then appending one or more random characters; then appending a checksum. In one example, the facility begins with the invariant characters "463"; then appends the random characters "2916"; then calculates and appends the checksum of "1" by calculating the modulo 0 value 1 of the sum of the preceding digits: 4+6+3+2+9+1+6=31, or 1. In this example, the facility generates the pairing code "46329161". Those skilled in the art will appreciate that, in various embodiments, the pairing code may contain numbers only; letters plus numbers; letters only; other combinations including non-letter-non-number symbols, etc.

In act 303, the facility causes display of the pairing code. In some embodiments, the facility performs act 303 by displaying the pairing code on its own display. In some embodiments, the facility performs act 303 by communicating the pairing code to an associated device having its own display, such as a smartphone, tablet, television remote control, etc.

Figure 4:
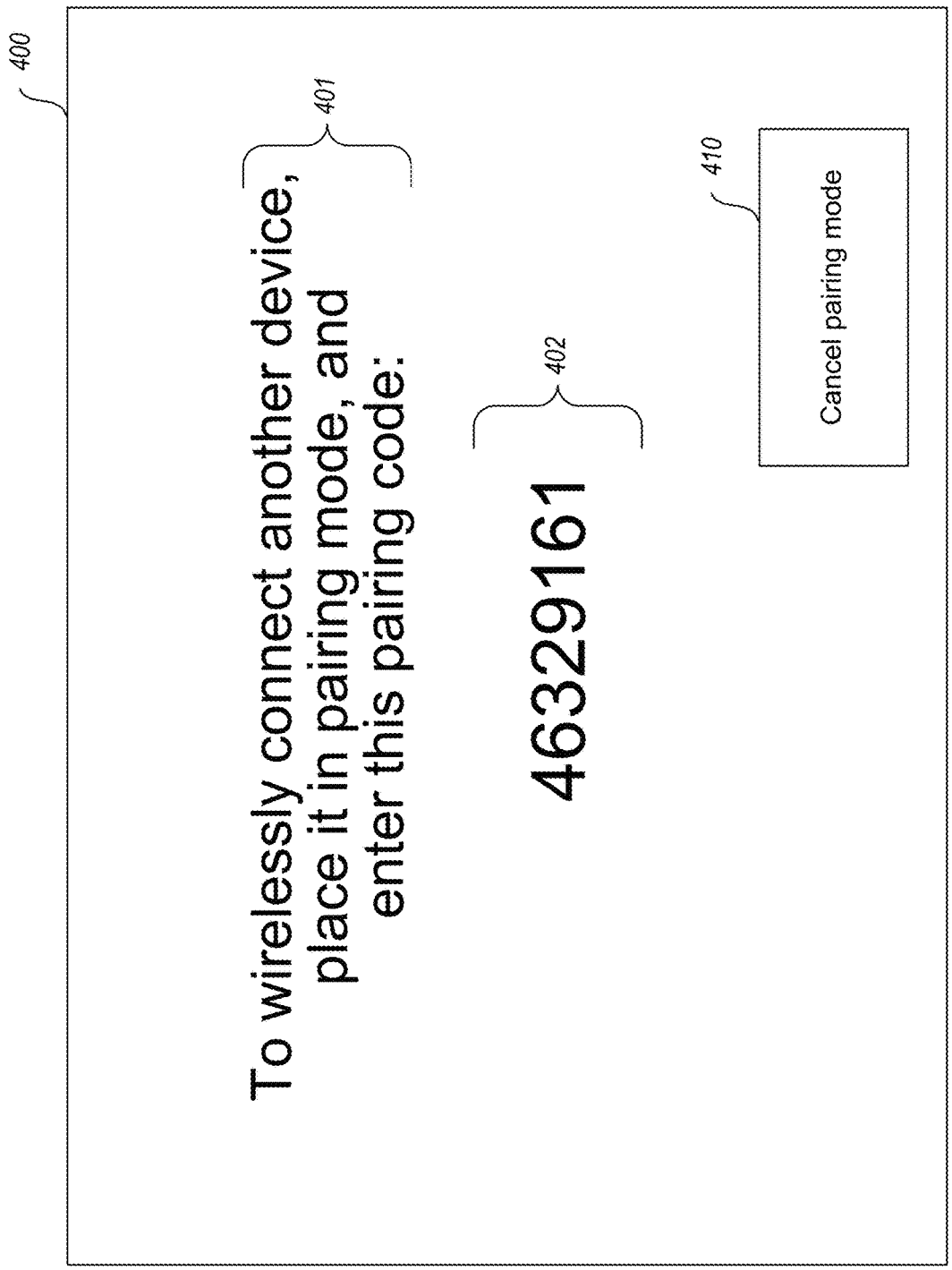
FIG. 4 is a display diagram showing a sample display presented by the facility in connection with the initiating device to display the pairing code.

FIG. 4 is a display diagram showing a sample display presented by the facility in connection with the initiating device to display the pairing code. The display 400 includes text 401 instructing the user on how to perform the pairing, as well as the one-time pairing code 402 generated in act 302. The display also includes a control 401 that the user can activate in order to cancel pairing mode if it was entered mistakenly.

Figure 5:
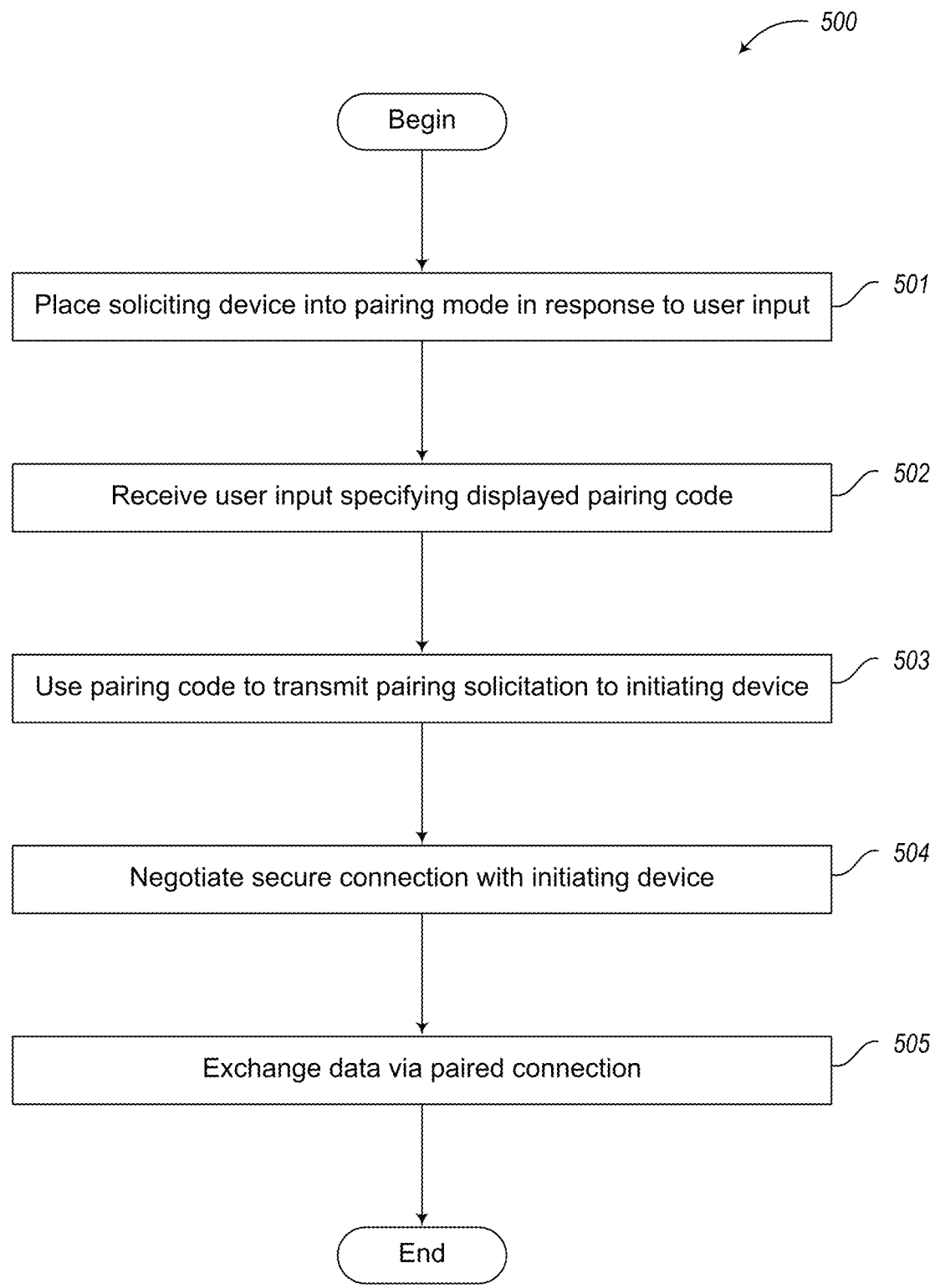
FIG. 5 is a flow diagram showing a process performed by the facility in some embodiments in a soliciting device to establish a wireless connection between the soliciting device and the initiating device.

FIG. 5 is a flow diagram showing a process performed by the facility in some embodiments in a soliciting device to establish a wireless connection between the soliciting device and the initiating device. In act 501, the facility places the soliciting device into pairing mode in response to user input. In various embodiments, this user input takes various forms, including those discussed above in connection with FIG. 2. In act 502, the facility receives user input specifying the pairing code that the initiating device caused to be displayed. In the example discussed above, the user enters pairing code "46329161". In various embodiments, in act 502, the facility uses a variety of input mechanisms to receive this user input, including those discussed above in connection with FIG. 2.

Figure 6:
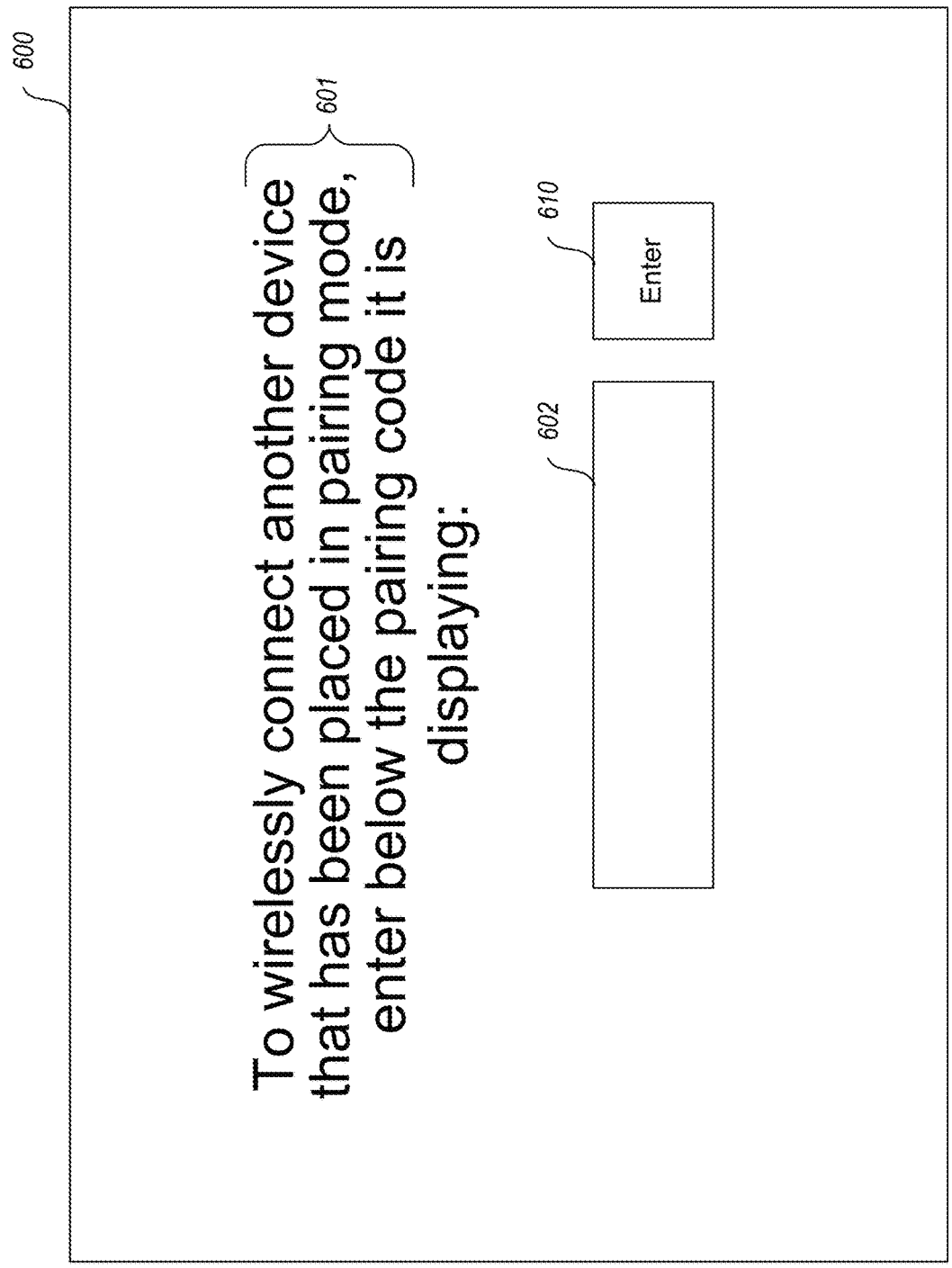
FIG. 6 is a display diagram showing a first display presented by the facility on the soliciting device in some embodiments to solicit user input specifying the pairing code.

FIG. 6 is a display diagram showing a first display presented by the facility on the soliciting device in some embodiments to solicit user input specifying the pairing code. The display 600 includes text 601 providing instructions to the user, as well as a pairing code entry field 602 for entry of the pairing code, and a control 610 to complete entry of the pairing code.

Figure 7:
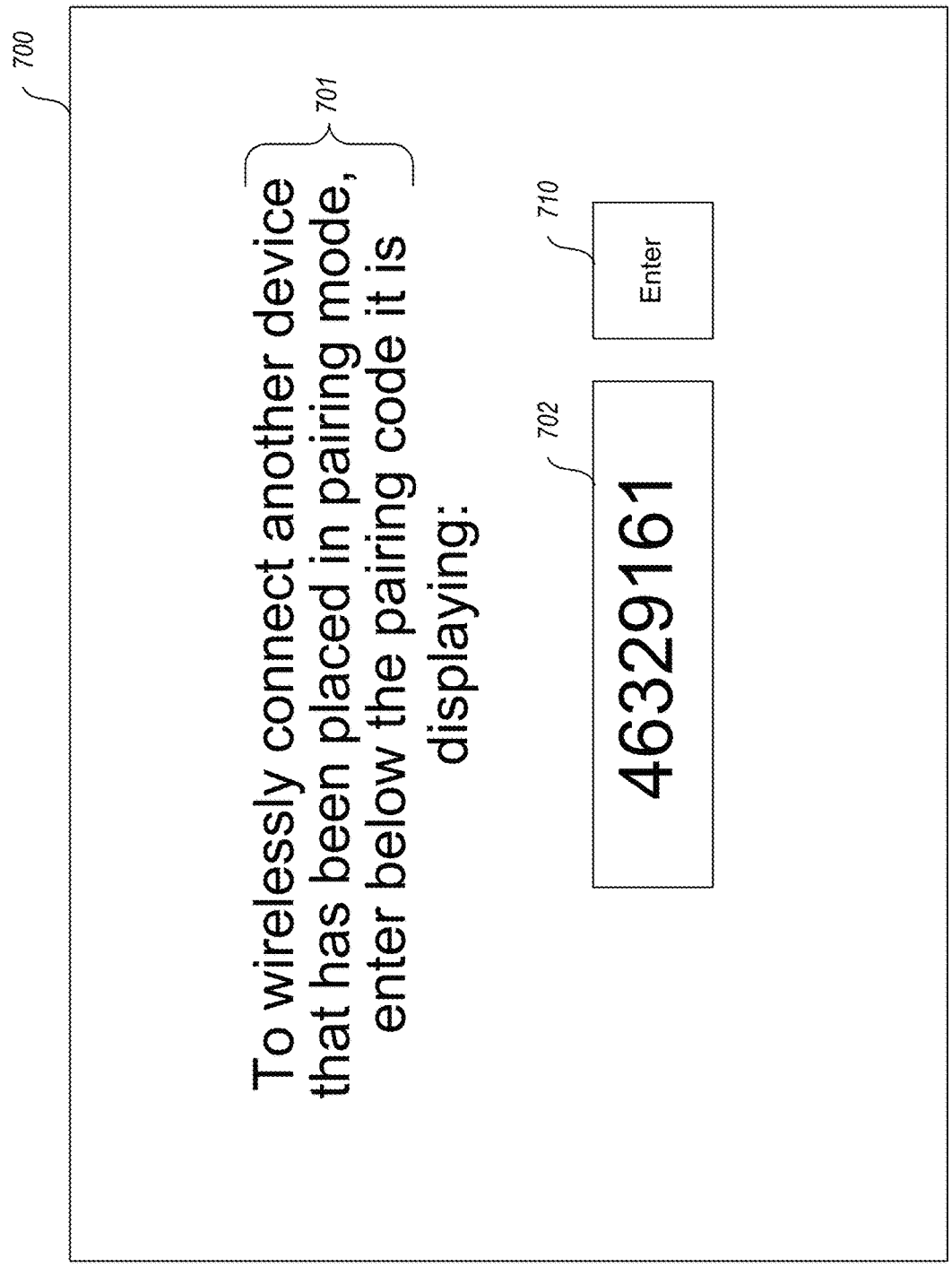
FIG. 7 is a second display diagram presented by the facility at the soliciting device in some embodiments to enter the pairing code.

FIG. 7 is a second display diagram presented by the facility on the soliciting device in some embodiments to solicit user input specifying the pairing code. It can be seen by comparing display 700 shown in FIG. 7 to display 600 shown in FIG. 6 that the user has entered the pairing code "46329161".

Returning to FIG. 5, in act 503, the facility uses the pairing code received in act 502 to transmit a pairing solicitation to the initiating device. In some embodiments, the pairing solicitation contains the pairing code in plaintext. In some embodiments, the pairing solicitation contains the pairing code manipulated in accordance with cryptographic functions, hashing functions, or other mathematical or procedural transformations that make it more difficult for an observer of wireless traffic to intercept and illicitly reuse the pairing code.

Returning to FIG. 3, in act 304, the facility receives the pairing solicitation from the soliciting device, which contains or otherwise reflects the pairing code. In act 305, based upon matching the pairing code generated in act 302 to the version of the pairing code included in the pairing solicitation, the facility negotiates a secure connection with the soliciting device. The soliciting device's side of this negotiation is shown in FIG. 5 as act 504. In act 306, based upon the secure negotiation of a secured connection with the soliciting device, the facility enrolls a pairing of the two devices. In act 307, the facility exchanges data via the paired wireless connection. This act is mirrored on behalf of the soliciting device in act 505 shown in FIG. 5. After act 307 shown in FIG. 3 and act 505 shown in FIG. 5, these processes conclude.

Those skilled in the art will appreciate that the acts shown in FIGS. 3 and 5 may be altered in a variety of ways. For example, the order of the acts may be rearranged; some acts may be performed in parallel; shown acts may be omitted, or other acts may be included; a shown act may be divided into sub-acts, or multiple shown acts may be combined into a single act, etc.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a media receiver device for establishing a wireless connection between the media receiver device and a media player device, the method comprising:
    causing a one-time pairing code to be displayed;
    wirelessly receiving from the media player device a wireless connection solicitation having contents;
    in response to the receiving, determining whether the contents reflect the one-time pairing code;
    in response to determining that the contents reflect the one-time pairing code, establishing the wireless connection between the media receiver device and the media player device; and
    cause the media receiver device to be able to exchange data with the media player device via the established wireless connection;
    wherein:
    the media player device comprises a television;
    the media receiver device comprises a television receiver that is operable to receive programming via a remote connection to a satellite or cable television service provider and communicate that programming to the television; and
    activating a pairing mode in the television triggers a prompt at the television to enter the one-time pairing code that the television receiver caused to be displayed.

2. The method of claim 1, further comprising using the established connection to transfer software from the media receiver device to the media player device suitable for installation on the media player device.

3. The method of claim 1, further comprising dynamically generating the displayed one-time pairing code.

4. The method of claim 1 wherein the causing causes the one-time pairing code to be displayed on a media display device connected to the media receiver by a wired connection.

5. The method of claim 1 wherein the causing causes the one-time pairing code to be displayed on a display device integrated into a portable device connected to the media receiver by a wireless connection.

6. One or more instances of non-transitory computer-readable media collectively having contents configured to cause a first device to perform a method for establishing a wireless connection between the first device and a second device, the method comprising:
    receiving user input specifying a one-time pairing code;
    generating a wireless connection solicitation message having contents based on the one-time pairing code;
    wirelessly transmitting the generated wireless connection solicitation message for receipt by the second device;
    exchanging additional wireless messages with the second device to establish the wireless connection between the first and second devices; and
    cause the first device to be able to exchange data with the second device via the established wireless connection;
    wherein:
    the first device comprises a television;
    the second device comprises a television receiver that is operable to receive programming via a remote connection to a satellite or cable television service provider and communicate that programming to the television; and
    activating a pairing mode in the television triggers a prompt at the television to enter the one-time pairing code that the television receiver caused to be displayed.

7. The one or more instances of non-transitory computer-readable media of claim 6 wherein the one-time pairing code specified by the received user input was displayed under control of the second device.

8. The one or more instances of non-transitory computer-readable media of claim 6 wherein the one-time pairing code specified by the received user input was generated by the second device.

9. The one or more instances of non-transitory computer-readable media of claim 6, the method further comprising using the established connection to transfer software from the second device to the first device suitable for installation on the first device.

10. The one or more instances of non-transitory computer-readable media of claim 6 wherein the first and second devices are media devices.

11. The one or more instances of non-transitory computer-readable media of claim 6 wherein the first and second devices are mesh network components.

12. The one or more instances of non-transitory computer-readable media of claim 6 wherein the first device is a general-purpose portable device having an integrated display.

13. A system for establishing a wireless connection, comprising:
    a first device having a wireless communication module, the first device adapted to:
    generate a one-time pairing code;
    cause display of the one-time pairing code;
    wirelessly receive from a second device having a wireless communication module a wireless connection message solicitation having contents;
    in response to the receiving, determine whether the contents reflect the generated pairing code;
    in response to determining that the contents reflect the one-time pairing code, establish the wireless connection between the first and second devices; and
    exchange data with the second device via the established wireless connection;
    wherein:
    the second device comprises a television;
    the first device comprises a television receiver that is operable to receive programming via a remote connection to a satellite or cable television service provider and communicate that programming to the television; and
    the television is adapted such that activating a pairing mode in the television triggers a prompt at the television to enter the one-time pairing code that the television receiver caused to be displayed.

14. The system of claim 13, further comprising:
    the second device, adapted to:
    receive user input specifying the one-time pairing code displayed by the first device;
    generate a wireless connection solicitation message having contents based on the one-time pairing code; and wirelessly transmit the generated wireless connection solicitation message for receipt by the second device.

15. The system of claim 13 wherein the first device's wireless communication module is integrated into the first device.

16. The system of claim 13 wherein the first device's wireless communication module is connected to the first device via a wired connection.

17. The system of claim 13 wherein the second device is a general-purpose portable device having an integrated display.

* * * * *